United States Patent Office 2,999,734
Patented Sept. 12, 1961

2,999,734
PROCESS FOR THE PRODUCTION OF ALUMINOSILICATE GELS
Horst Weber and Ernst Podschus, Leverkusen, Germany, assignors to Farbenfabriken Bayer Aktiengesellschaft, Leverkusen, Germany, a corporation of Germany
No Drawing. Filed Jan. 9, 1959, Ser. No. 785,805
Claims priority, application Germany Jan. 16, 1958
12 Claims. (Cl. 23—113)

This invention relates to a novel method of preparing an alumino-silicate which is especially useful as an ion exchanger and also is useful for other purposes. Many of these materials have the composition $$Me^{+1}_2O \cdot Al_2O_3(SiO_2)_x \cdot yH_2O$$

or $$Me^{+2}O \cdot Al_2O_3(SiO_2)_x \cdot yH_2O$$

where $Me^{+1}$ is an alkali metal or like metal of group I of the periodic table of elements, such as sodium, potassium or lithium, $Me^{+2}$ is a metal of group II of the periodic table, such as calcium, barium, strontium, magnesium, zinc or the like, $x$ denotes the molecular ratio of $SiO_2$ to $Al_2O_3$ and usually is in the range of 2 to 15.

Silicate xerogels have gained technical and scientific importance as the first synthetic cation-exchangers and the Ag-aluminosilicates obtainable therefrom as desalting agents for rendering sea water drinkable.

Na-aluminosilicate xerogels have hitherto mainly been produced according to methods in which Na-silicate, Na-aluminate, and Al-sulphate solutions, or only Na-silicate and Na-aluminate solutions, are mixed to form a solid homogeneous hydrogel which includes the whole of the reaction liquid with the evolved electrolytes or reaction products, NaOH and $Na_2SO_4$. Since these reaction products tend to cause agglomeration of the siliceous product during drying and to impair the ion exchange properties thereof, their removal before drying is highly desirable. However, this is made impossible by the fact that the hydrogels obtainable according to the simple mixing methods employed are practically unfilterable or unwashable. In a very cumbersome way only, such as drying at temperatures below 80° C. and at an artificially increased atmospheric moisture, is it possible to obtain xerogel products of a comparatively satisfactory ion exchangeability.

According to the present invention, a process has been provided by which such aluminosilicates may be prepared in a simple manner and in a form from which water can be readily removed. According to this process, an alkali metal silicate, an alkali metal aluminate, and a water soluble aluminum salt are rapidly mixed together in aqueous medium and in a zone of mixing, and the mixture is removed from the mixing zone before substantial precipitation can occur. Thus, precipitation of the aluminosilicate takes place away from the mixing zone, preferably in a zone of relative quiescence. This may be accomplished readily by continuously combining alkali metal silicate, alkali metal aluminate, and aluminum salt solutions, preferably Na-silicate, Na-aluminate, and Al-sulphate solutions, with intense stirring, and removing the resulting mixture before substantial growth of primary particles can occur, preferably with a stay in the mixer of less than about 10 seconds, to form a homogeneous mixture of the composition (0.03–0.15) m $[Na_2O \cdot Al_2O_3 \cdot (1.5-5)SiO_2]$
+(0.005–0.20) m $Na_2SO_4$+(0.03–0.15) m NaOH (m denoting moles in the above equation), separating the hydrogel from the liquid, preferably washing it free from electrolyte, and drying it at temperatures of up to 300° C., if desired. The aluminosilicates obtainable according to the new process may advantageously be used as ion exchangers, desalting agents, adsorbents, especially as drying agents, as catalysts or as starting or carrier materials for catalysts.

In the working method according to the invention, the rapid mixing within a small space presumably ensures that the speed of forming a crystal nucleus is greater than the speed of particle growth and thus ensures the formation of a very finely divided hydrogel. According to electron micrographs, the size of the primary particles is about 0.005 to 0.010 micron, corresponding to a specific surface of 300 to 600 square meters per gram. A visible indication of the fine division is the transparency and, disregarding a small portion of mother liquor which is split off synergetically, the homogeneity of the product. At a stay in the mixer of more than about 10 seconds or at higher concentrations than those used in the above mentioned range, the mass acquires a milky cloudiness indicating an increase of the particle size. Despite their fine division, the aluminosilicate particles are not cross-linked into a solid gel so that the mass may be poured, pumped, filtered and washed without any special pretreatment.

The filtration may be carried out through a suction or pressure filter or also in a filter centrifuge. The washing which is advantageously effected during filtration, intermediate suspension and decantation being also possible, requires about 1.5 to 2.0 liters of water per liter of starting gel in order to achieve a practically complete removal of the electrolytes NaOH and $Na_2SO_4$ (residual $SO_3$ content in the dry final product less than 0.01 percent). The content of solids in the filter cake is about 10 percent after filtration with suction and about 12 to 15 percent after filtration by centrifuging at a rate of about 1500 g (g=acceleration due to gravity).

The aluminosilicate hydrogels obtained according to the working method described above (see, also, Example I) and washed free from electrolyte exhibit the following advantages:

Firstly, the drying required for the conversion into the xerogel form can be effected in the absence of mineralizers in the usual manner without need of artificially increasing the atmospheric moisture at temperatures of above 110° C. and, therefore, much more rapidly and simply than with the previous processes. Even a temperature of above 300° C. does not detrimentally influence the specific surface or the ion exchangeability.

Secondly, the hydrogels, by even partially drying to a solids content of 15 to 30 percent, can be pressed, for example, in a gear granulator into moldings of uniform size and shape which shrink appreciably during the drying and conversion into a hard xerogel, but maintain their uniform shape (see Example II).

Thirdly, the hydrogels can be converted by suspension with stirring into a very finely divided homogeneous suspension from which aluminosilicates with other cations are easily obtainable by kinetically strongly promoted ion exchange reactions (see Example III).

The following examples are given for the purpose of illustrating the invention:

EXAMPLE I

Manufacture of a Na-aluminosilicate hydrogel free from foreign matter:
A 0.195 molar solution of $Na_2O \cdot 3.3SiO_2$, a 0.20 molar solution of $1.5Na_2O \cdot Al_2O_3$, and a 0.10 molar solution of $Al_2(SO_4)_3$, in a ratio per volume of 1.0:1.0:0.53, are conducted from three storage containers at a total rate of about 50 liters per hour via measuring capillaries into a Kotthoff mixing mill (2800 revolutions per minute), the mixing space of which is limited to less than 100 milliliters by a closed stator head having only a small outlet orifice of about 50 square millimeters' cross-section. The discharged mixture, having a composition of about 0.10 m $Na_2O.Al_2O_3.2.5SiO_2+0.063$ m $Na_2SO_4+0.063$ m $NaOH$, is subjected to filtration by suction, pressure or centrifuging, with simultaneous washing with 1.5 to 2.0 liters of water per liter of initial gel. The average retention time of the reactants in the stator head was about one second.

EXAMPLE II

Manufacture of xerogel moldings:

The hydrogels free from foreign matter obtainable according to Example I are evenly dried to 20–25 percent of solids in, for example, a drying oven, a sieve drier or a heatable kneading worm with suction device, and then pressed into moldings of uniform shape and size, for example, in a Hutt gear granulator. By drying at 110 to 300° C., the substances are converted into the xerogel form having a composition of about $$0.9Na_2O.Al_2O_3.2.5SiO_2.2(4)H_2O$$

the first value for $H_2O$ referring to xerogel dried at 110° C. and the second to xerogel exposed to air having a relative humidity of 75 percent at room temperature for 14 days.

EXAMPLE III

Manufacture of an Ag-aluminosilicate xerogel:

The hydrogel filter cake free from foreign matter obtainable according to Example I is treated with a 1 molar solution of $AgNO_3$ in a quantity of 2 liters per mole of $Al_2O_3$ and stirred for at least 5 minutes. The Ag-aluminosilicate gel thus formed is filtered off, washed salt-free, dried at 100 to 200° C., and ground.

Some properties of the Na-aluminosilicate xerogels thus obtainable are listed in Table I in comparison with silica gel and active carbon. These figures show the advantage offered by use of the substances as driers since they possess a higher absorbing power than silica gel or active carbon at low atmospheric moistures. On account of their high specific surface and the heteropolar structure of their primary particles (anionic aluminosilicate skeleton with loosely bound cations), they are also suitable as adsorbents for other substances than water, for example, for the separation of gaseous substances by chromatography, particularly of those of low molecular weight ($H_2$, $N_2$, CO, $CO_2$, $CH_4$) which are not separated on $SiO_2$ or active carbon fillers or only with difficulty, and also as catalysts or as starting or carrier materials for catalysts. The improvement of the ion exchangeability of the Na-aluminosilicate xerogels by the present method of production is clearly shown by the corresponding figures of Table I and Table II.

Table I

PROPERTIES OF Na-ALUMINOSILICATE XEROGELS COMPARED WITH SILICA GEL AND ACTIVE CARBON

| | Spec. Surface, m.²/g. | Water adsorption in percent by weight at 23° C. and a relative humidity of— | | | | Exchangeability, meq.,[1] Ca/g. |
|---|---|---|---|---|---|---|
| | | 75% | 16% | 2% | 0.5% | |
| Na-alumino-silicate xerogel: | | | | | | |
| A [2] | 250–450 | 23 | 5.2 | 2.2 | 1.1 | 2.5–3.5 |
| B [2] | 50–250 | 15 | 5.0 | 2.2 | 1.1 | 1.5–2.0 |
| Silica gel | 300–600 | 30 | 7.0 | 1.7 | 0.8 | |
| Active carbon | ca. 1,500 | 52 | 1.5 | | 0.3 | |

[1] meq.=(milligram equivalents).
[2] A denotes the Na-aluminosilicate xerogels obtainable according to Example I and II, B those obtainable by previous processes, i.e., by drying the unwashed hydrogel at 80° C.

Table II

EXCHANGEABILITY OF Na-ALUMINOSILICATE XEROGELS AS A FUNCTION OF THE SPECIFIC SURFACE

| Specif. Surface m.²/g. | $Na_2O$ Content, Percent | Exchangeability in meq.,[1] Ca/g. | | |
|---|---|---|---|---|
| | | theory | found | percent |
| 49 | 10.9 | 3.53 | 1.11 | 31 |
| 62 | 12.05 | 3.89 | 1.58 | 41 |
| 107 | ca. 8 | | 1.64 | |
| 112 | ca. 12 | | 1.75 | |
| 172 | ca. 12 | | 1.90 | |
| 219 | 14.8 | 4.77 | 2.50 | 52 |
| 235 | 13.75 | 4.43 | 2.60 | 59 |
| 254 | 12.0 | 3.87 | 3.48 | 90 |
| 270 | 9.85 | 3.18 | 2.06 | 65 |
| 292 | 9.7 | 3.13 | 2.63 | 84 |
| 422 | 13.3 | 4.29 | 2.32 | 54 |

[1] meq.=(milligram equivalents).

Especially valuable products having excellent ion exchange properties are obtained by treating the alkali metal aluminosilicates described above with an aqueous solution of a water soluble silver salt, such as silver nitrate. This produces the Ag-aluminosilicate by replacement of sodium with silver.

The Ag-aluminosilicates obtainable according to the present process possess better desalting properties than the products obtainable from xerogels, as can be seen from Table III. The values given therein were determined by stirring 10 grams of the powdered substances with 100 milliliters of a 0.5 N NaCl solution and titration of the amount of chlorine remaining in the liquid. In order to render water from the North Sea drinkable, i.e., to desalt from an initial concentration of 0.469 N Cl and 0.465 N $SO_4$ to a final concentration of less than 0.129 N Cl and 0.015 N $SO_4$ without exceeding a pH value of 9, there are required, in addition to 1.3 grams of synthetic resin exchanger charged with Ba ions per 100 milliliters of liquid used, the amounts of Ag-aluminosilicate given in Table IV.

Table III

PROPERTIES OF Ag-ALUMINOSILICATES OBTAINABLE ACCORDING TO EXAMPLE III (A) IN COMPARISON WITH THE PRODUCTS OBTAINABLE FROM Na-ALUMINOSILICATE XEROGELS (B)

| | A | B |
|---|---|---|
| Specific surface m.²/g | 150–400 | 30–200 |
| Drying loss at 110° C percent | 5.5 | 5 |
| Ignition loss at 800° C percent | 12 | 12 |
| Density g./cm.³ | 3.1 | 2.7 |
| Bulk density g./cm.³ | 0.82 | 0.75 |
| Content of $Ag_2O$ percent | 40–42 | 28–30 |
| Desalting power meq., Cl/g | 3.3–3.6 | 2.3–2.5 |
| Desalting power meq., Cl/cm.³ | 2.7–3.0 | 1.7–1.9 |

The specific surfaces were determined on substances heated to 150° C. All other data relate to products exposed to air for 1 to 2 days. The meq./cm.³ values of the desalting powers were calculated from the meq./g. value and the bulk density.

Table IV

USE OF Ag-ALUMINOSILICATES FOR THE DESALTING OF SEA WATER

| | A* | B* |
|---|---|---|
| Ag-aluminosilicate per 100 ml. of sea water g | 10.2 | 14.2 |
| Ag-aluminosilicate powder per 100 ml. of sea water ml | 12.4 | 18.9 |
| Ag-aluminosilicate powder per 100 ml. of useful water ml | 16.6 | 29.4 |

*See footnote 2, Table III.

In the processes of the above examples, sodium silicate having the composition $Na_2O(SiO_2)_{3.3}$ was used. It is to be understood that other silicates containing 1 to 5 moles of $SiO_2$ per mole of $Na_2O$, or other alkali metal oxide, may be used in lieu of the sodium silicate mentioned in the examples. Moreover, the corresponding potassium silicates may be used in lieu of all or a portion of the sodium silicates.

Other water soluble salts of aluminum and acids and which have the general formula $Al_a(An)_3$, where An is the anion of the acid and "$a$" the valence of the anion, may be used. Typical salts which may be used in lieu of aluminum sulphate in the above examples are aluminum chloride, aluminum nitrate, aluminum acetate, aluminum bromide, and like salts of mineral or other acids.

Potassium aluminate may be used in lieu of sodium aluminate.

The reaction is conducted at any convenient temperature at which the mixture is liquid, usually 25 to 50° C., rarely above 100° C. or below 10° C.

Whereas Table III indicates the desalting capacity in meq. of chlorine per gram and meq. of chlorine per cm.$^3$ of Ag-exchanger, Table IV shows the desalting capacity in gram of an Ag-exchanger which is required to desalt 100 ml. of sea-water or in ml. of Ag-exchanger required to obtain 100 ml. of potable water. The latter quantity is of course larger, since a part of the water is retained by the exchanger and does not run off as potable water.

Although the present invention has been described with particular reference to the specific details of certain embodiments thereof, it is not intended that such details shall be regarded as limitations upon the scope of this invention except insofar as included in the accompanying claims.

What is claimed is:

1. Process for the manufacture of aluminosilicate gels characterized by continuously combining simultaneously solutions of alkali metal silicate, alkali metal aluminate, and aluminum salt of an acid with intense stirring, at a stay in the mixer of less than 10 seconds, to form a homogeneous hydrogel mixture separating the hydrogel from the liquid and drying it at temperatures of up to 300° C.

2. Process for the manufacture of molded aluminosilicate xerogels characterized by partially drying the undried aluminosilicate hydrogel obtainable according to claim 1 to a solids content of about 15 to 30 percent by weight by pressing the mass into moldings and drying these at temperatures of up to about 300° C.

3. Process for the manufacture of ion exchange products of aluminosilicate gels characterized by reacting the substances obtainable according to claim 1 with the aqueous solution of a salt, and filtering, washing salt-free, and drying the product.

4. Process for the manufacture of Ag-aluminosilicates having a desalting power of 3.3–3.6 meq./g. characterized by reacting an undried aluminosilicate hydrogel obtainable according to claim 1 with an aqueous solution of an Ag salt, and filtering, washing salt-free, and drying the product.

5. A process for the production of an aluminosilicate which comprises rapidly mixing simultaneously in a zone of agitation an alkali metal silicate, an alkali metal aluminate, and a water soluble aluminum salt of an acid in aqueous medium, removing the resulting mixture from the zone of agitation before substantial precipitation occurs, and thereby producing an aluminosilicate precipitate at a point spaced from the zone of mixing.

6. A process for the production of an aluminosilicate which comprises rapidly mixing simultaneously in a zone of agitation an alkali metal silicate, an alkali metal aluminate, and a water soluble aluminum salt of an acid in aqueous medium, removing the resulting mixture from the zone of agitation before substantial precipitation occurs to a more quiescent zone, and thereby producing an aluminosilicate precipitate in said quiescent zone.

7. The process of claim 5 wherein the mixture is removed from the zone of mixing in not over 10 seconds from the time mixing has commenced.

8. A process of preparing an aluminosilicate which comprises feeding simultaneously alkali metal silicate, an alkali metal aluminate, and a water soluble aluminum salt of an acid to an aqueous medium in a zone of mixing, and withdrawing the resulting mixture from the zone of mixing before substantial precipitation occurs.

9. A process of preparing an aluminosilicate which comprises feeding simultaneously alkali metal silicate, an alkali metal aluminate, and a water soluble aluminum salt of an acid to an aqueous medium in a zone of mixing, and withdrawing the resulting mixture from the zone of mixing so rapidly that the average retention time of the reactants in the zone of mixing is not more than 10 seconds.

10. The process of claim 8 wherein the alkali metal is sodium.

11. A process of preparing an aluminosilicate which comprises feeding simultaneously alkali metal silicate, an alkali metal aluminate, and a water soluble aluminum salt of an acid to an aqueous medium in a zone of mixing, withdrawing the resulting mixture from the zone of mixing before substantial precipitation occurs, and reacting the resulting aluminosilicate with a water solution of silver salt.

12. A process for preparing aluminosilicate gels which comprises simultaneously combining alkali metal silicate, alkali metal aluminate, and aluminum salt of an acid solution with intense stirring at a stay in the zone of intense agitation of less than 10 seconds to form a homogenous hydrogel mixture, filtering the hydrogel from the liquid, washing on the filter the separated hydrogel to remove electrolyte and thereafter drying the washed hydrogel.

References Cited in the file of this patent

UNITED STATES PATENTS

| | | |
|---|---|---|
| 1,161,200 | Brunn | Nov. 23, 1915 |
| 1,906,202 | Bruce | Apr. 25, 1933 |
| 1,965,923 | Griessback et al. | July 10, 1934 |
| 2,232,727 | Peterkin et al. | Feb. 25, 1941 |
| 2,512,053 | Calmon | June 20, 1950 |